United States Patent [19]
Hammonds

[11] Patent Number: 5,979,562
[45] Date of Patent: Nov. 9, 1999

[54] HOOF CARE STAND FOR LIVESTOCK

[76] Inventor: Jack Hammonds, 5828 El Dorado, #11, El Cerrito, Calif. 94530

[21] Appl. No.: 09/058,475

[22] Filed: Apr. 10, 1998

Related U.S. Application Data

[60] Provisional application No. 60/044,282, Apr. 28, 1997.
[51] Int. Cl.[6] .............................. A01L 11/00; F16M 11/00
[52] U.S. Cl. ..................... 168/44; 248/440.1; 248/163.1
[58] Field of Search .................................. 119/726, 728; 168/44; 248/83, 163.1, 175, 176.1, 440.1, 444, 450

[56] References Cited

U.S. PATENT DOCUMENTS

| | | | |
|---|---|---|---|
| 61,897 | 2/1867 | Tucker | 168/44 |
| 465,039 | 12/1891 | Baker et al. | 248/175 |
| 694,865 | 3/1902 | Kachold | 248/175 |
| 822,158 | 5/1906 | Seward | 168/44 |
| 2,642,744 | 6/1953 | Thomas | 73/429 |
| 2,932,479 | 4/1960 | Leach | 248/129 |

*Primary Examiner*—Michael J. Carone
*Assistant Examiner*—Son T. Nguyen
*Attorney, Agent, or Firm*—Miller, Sisson, Chapman & Nash, P.C.

[57] ABSTRACT

A farrier's stand of steel rod construction having an elliptical-shaped hoof cradle. A method for constructing the stand includes bending parallel, connected rods over a mandrel in a jig. The rods are separated between certain connections to form a hoof cradle. The inverted U-shaped stand is supported by a composite apex leg and two spaced-apart, singular rod legs.

2 Claims, 5 Drawing Sheets

HOOF CARE STAND FOR LIVESTOCK

This application claims the benefit of U.S. Provisional Appln No. 60/044,282 filed Apr. 28, 1997.

BACKGROUND OF THE INVENTION

1. Field of The Invention

The present invention relates to a farrier's stand and, more particularly, to a unitary, three-legged stand which safely and efficiently supports the hoof of an animal in an open, elliptically-shaped cradle.

2. Background Information

Maintaining animal hooves is an exacting art involving considerable physical labor including raising and holding the hoof, usually between a farrier's legs, while preparing and fitting the hoof with a shoe. The work may also include pulling nails, filing, cutting and hammering. The farrier works with the knowledge that mistakes made during the process may disable the animal. Farriers are confronted with horses which tend to lean on the shoer, or may be startled or disturbed by the shoeing operation or environmental conditions.

The prior art in this area seeks to reduce the farrier's burden. However, prior art stands are plagued with problems. Some stands are mounted on large heavy blocks, restricting use and portability. U.S. Pat. Nos. 120,119; 124,452; and 1,270,204, all teach some kind of physical strap or clamping member to restrain the animal's hoof on the stand. This stand can be extremely dangerous if the animal becomes excited and bolts or jumps with its leg strapped in the stand.

U.S. Pat. No. 3,659,653, seeks to avoid the "trapped hoof" problem by providing an adjustable constraining apparatus operated by the farrier's foot. This device still lends itself to trapping the animal's hoof. Further, the stand has multiple parts increasing manufacturing costs and maintenance costs.

U.S. Pat. No. 3,696,869 discloses a collapsible stand which does not retain the animal's leg. However, the stand contains several complicated springs and assemblies and depends upon a relatively fragile physical relationship between two parts to properly support a horse's hoof. The stand is supposed to adequately support the horse's hoof during various care operations, and to easily collapse if the animal lifts its hoof off of the stand. Thus, if the animal chooses to life its hoof and reset it more comfortably, the stand tends to collapse requiring the farrier to reset the stand.

U.S. Pat. No. 4,167,216 illustrates a multipurpose stand for accommodating hoofed animals. This stand, while simple in construction, is unstable. It is meant to be easily tipped over into one of two different working positions. Thus, during use it may easily be flipped inadvertently.

Therefore, there exists a need for a farrier's stand which is lightweight for transport, stable, and trap-free. In addition, the stand must be manufactured from minimum parts to ensure minimal manufacturing and maintenance cost.

SUMMARY OF THE INVENTION

The present invention provides an improved apparatus, and method of making same, to assist the farrier in taking care of livestock. More particularly, the present invention comprises a stable stand with an open triangular base. The stand is unitary and requires no attachment to other objects. The stand has no closed areas large enough to entrap an animal hoof. The stand is easily portable by the farrier. Each downwardly extending leg of the triangular base is connected to an outwardly extending foot element. Foot elements at the base of the triangle encourage the proper placement by the farrier with respect to the horse during use. Further, the farrier may stand upon the feet elements to increase stand stability.

The triangular base of the stand is formed with a semi-open juncture of two U-shaped rods which have been welded together at one side, and are spaced apart at the opposite side. As the legs extend upwardly from the foot elements, they cooperate to form a cradle-like opening into which the animal's hoof may be placed. The cradle is a simplistic structure which consists of a mouth-like elliptical opening with a single limiting element in the bottom of the cradle padded to ensure the animal's comfort. No openings exist in the stand, other than that offered by the cradle, which could trap the animal's hoof. Accordingly, the present invention provides an improved farrier's stand which is relatively lightweight and stable, offering additional feet for improved stability. The stand also provides a comfortable, non-restraining resting position for the animal during use and presents no traps which may be hazardous to the animal or farrier. Further, the stand has few parts which wear out during use, the exception being the padding of the cradle element.

These together with other advantages of the present invention will become subsequently apparent in the details of construction and operation as more fully hereinafter described and claimed. Other improvements provided by the present invention will become apparent in the following specifications when considered in light of the attached drawings, wherein a preferred embodiment of the invention is illustrated, along with a method of its manufacture.

BRIEF DESCRIPTION OF THE DRAWINGS

The invention will be better understood and objects other than those set forth above will become apparent when consideration is given to the following detailed description of the preferred embodiments. Such description makes reference to the annexed drawings wherein.

DETAILED DESCRIPTION OF THE PREFERRED EMBODIMENT

Figure 1:
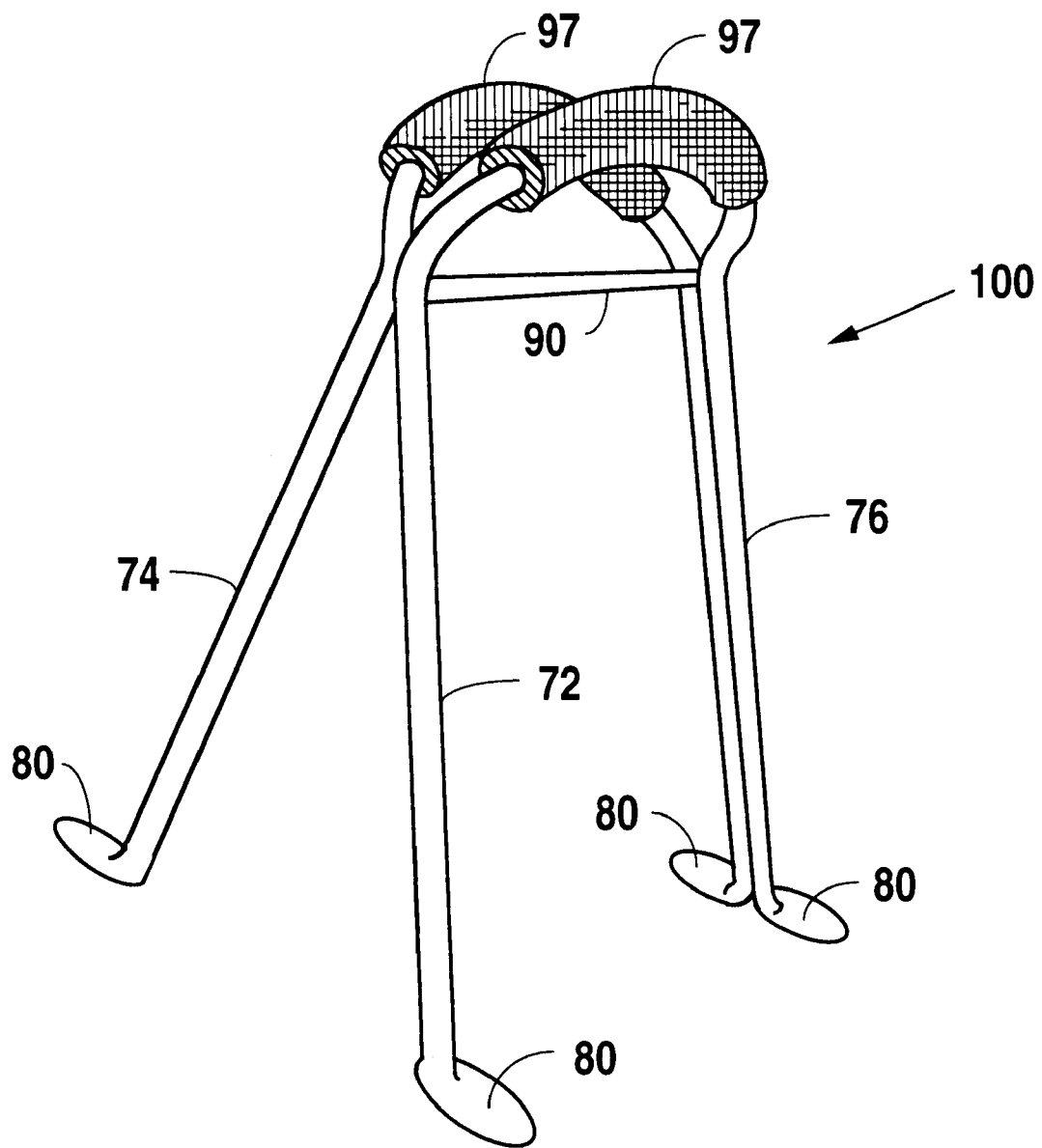
FIG. 1 is a side-elevation perspective view of the present invention.

FIG. 1 illustrates a perspective view of the preferred embodiment of the present invention. As can be seen in this figure, the basic stand (100) consists of three upwardly extending legs, left base leg (72), right base leg (74), and composite, apex leg (76), connected so as to form an elliptical cradle (95) at their respective intersections. Each of legs (72), (74), and (76) are terminated by one or more foot elements (80) as they come to rest on ground or other supporting surface. Cradle (95) is covered with padding (97), fabricated from automotive heater hose, or some other soft, yet durable, composition. Padding (97) may be attached to cradle (95) by adhesive, stitching, or other attachment means.

Stand (100) is used to aid the farrier during care of a hoofed animal, where the leg of the animal must be raised from the ground and supported in a comfortable, safe position that allows the desired operation to be performed by the farrier with minimum objection by the animal. When the animal rests its hoof in cradle (95), secured and padded by padding (97), stand (100) may be used as an aid in trimming and shoeing the hoof or foot, in medical applications, such as cutting abscesses, bandaging wounds, during cleaning and applying topical solutions to the hoof or foot, and clipping hair on the foot and leg.

Stand (100) is used by raising the animal's leg and placing the cradle (95) covered by padding (97) under the foot or leg, in the position most comfortable for the animal and the farrier. When the animal's foot or leg is resting within the cradle (95), it may be either gently supported or released by the farrier. The shape of the cradle (95), coupled with its position atop the triangular base formed by legs (72), (74) and (76), ensures proper positioning of the animal's foot and usage by the farrier, with minimal interference from the stand (100). For maximum stability, the farrier may place one or both of his feet on the foot elements (80) located at the distal ends of left base leg (72), right base leg (74), or even the composite apex leg (76).

Stand (100) also offers several safety features. There are no moving parts to wear out, or closed loops to entangle the animal or farrier. In addition, there are no sharp edges present to injure either party. The simplicity of stand (100) lends itself to inexpensive and easy manufacture without a multiplicity of parts which must be serviced or adjusted. Stand (100) is formed in such a way that its use mirrors the farrier's working style as it would be performed without the aid of any such stand (100), resulting in easy adaptation by the farrier and animal, even without prior experience.

Figure 2:
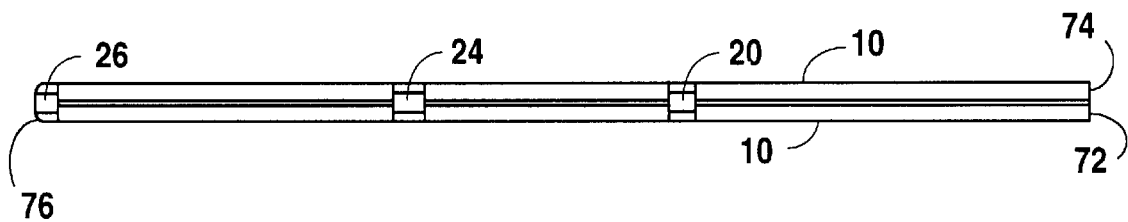
FIG. 2 is a top view of the first stage of construction of the present invention.

Turning now to FIG. 2, the first stage of construction of stand (100) may be seen. The stand may be constructed from iron, or any other suitable material which is sufficiently strong to support the weight of the animal tended. For example, aluminum or a strong plastic composition may be used. The particular construction method described herein may not apply to a molded plastic, but would apply with any bendable composition, and is intended to be a means of illustration by example, and not a limitation on the possible methods of constructing the apparatus.

Steel rods (10), approximately 44½ inches long, are placed side-by-side welded together at base weld (20) (approximately 16½ inches from the end point location of left base leg (72) and right base leg (74)), at middle weld (24) (approximately 27½ inches from end point location of left base (72) and right base leg (74)), and at the end point location of apex leg (76). The length of welds (20), (24), and (26) is approximately 1 inch.

Figure 3:
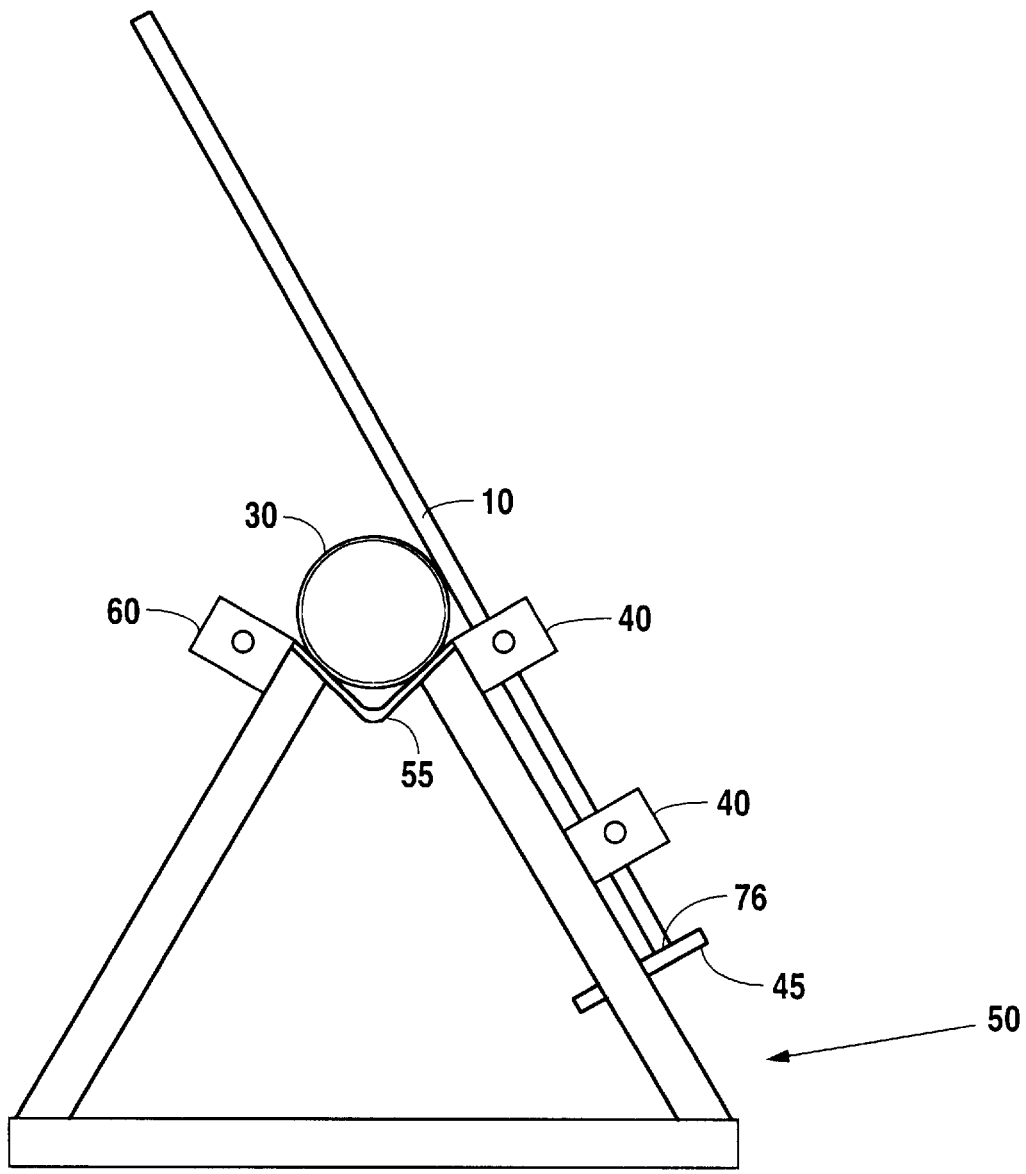
FIG. 3 is a side view of the present invention in the second stage of manufacturing attached to a jig.

The welded and heated rods (10) are then placed in a jig (50), as shown in FIG. 3. The welded steel rods (10) are then heated between the locations of base weld (20) and middle weld (24) until the rods (10) are malleable enough to bend easily. Apex leg (76) is brought into firm contact with rest (45) and clamped into position with clamps (40). Heated rods (10) are then bent over mandrel (30), which is located in trough (55) at the apex of jig (50). Rest (45) is located approximately 16 inches from the bottom of trough (55). Mandrel (30) has a diameter of approximately 6½ inches.

Figure 4:
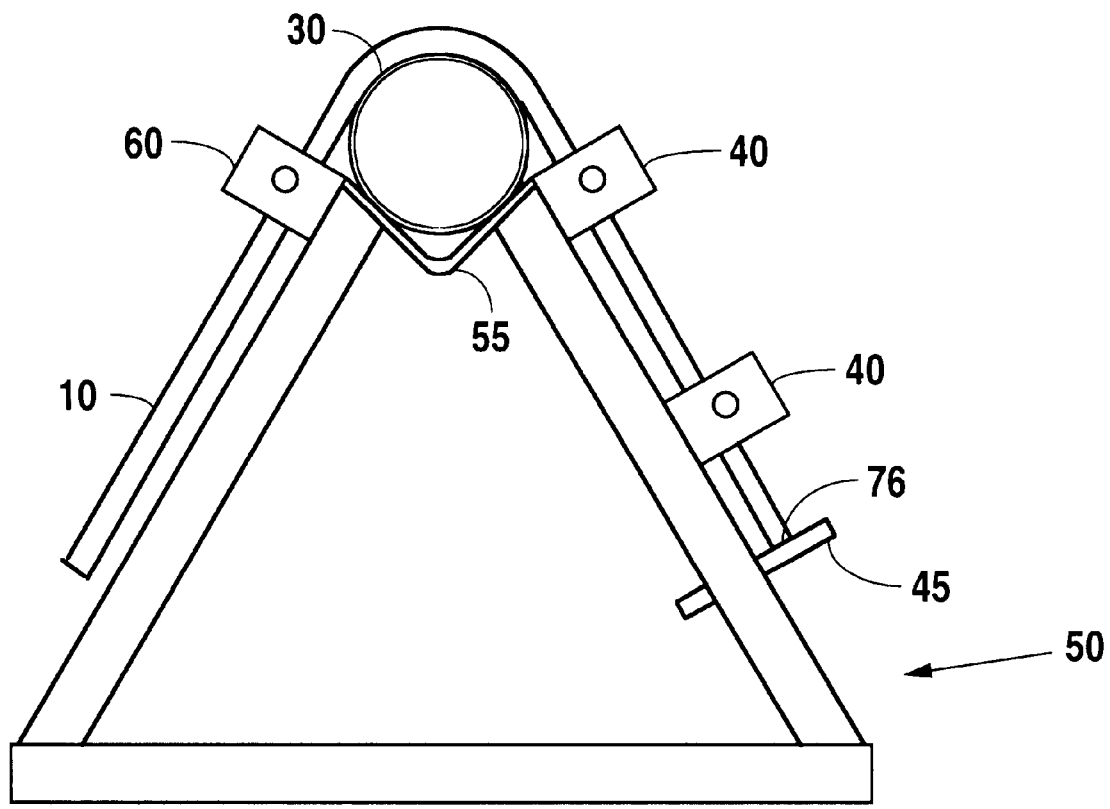
FIG. 4 is a side view of the present invention in the third stage of manufacturing attached to a jig.

As shown in FIG. 4, the heated steel rods (10) are then bent over mandrel (30) until they can be held in place by retainer (60). The resulting structure consists of an apex leg (76) which measures approximately 16½ inches long, connected to a 6½ inches inner diameter U-shaped section at the circumference of mandrel (30), followed by the balance of the length of welded steel rods (10).

Figure 5:
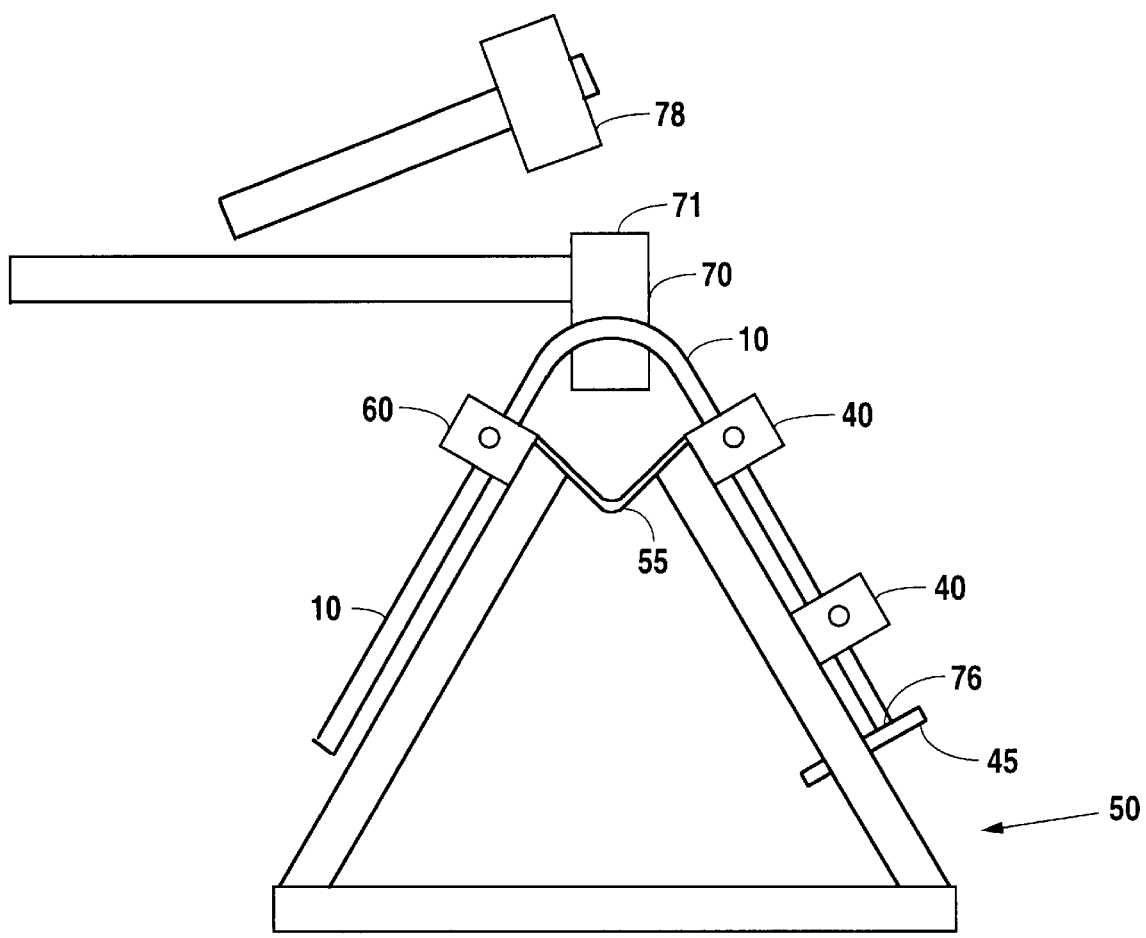
FIG. 5 is a side view of the present invention in the fourth stage of manufacturing attached to a jig.

Turning now to FIG. 5, it can be seen that the mandrel (30) has been removed. After again heating the steel rods (10) between base weld (20) and middle weld (24), wedge (70) is placed between rods (10). The wedge may be struck with mallet (78) so as to separate rods (10) to form cradle (95) (see FIG. 6). Mallet (78) is used to form cradle (95) by striking the wedge top (71).

Figure 6:
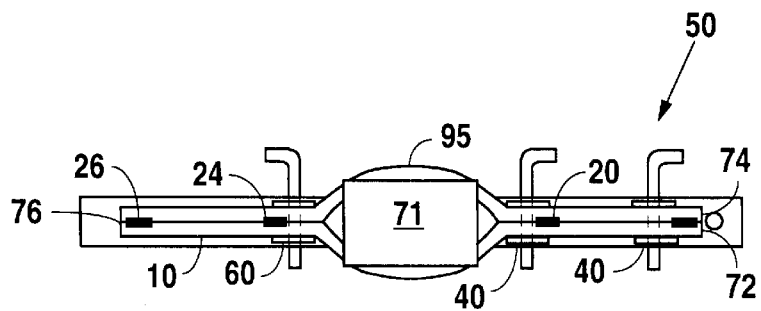
FIG. 6 is a top view of the present invention in the fourth stage of manufacturing attached to a jig.

FIG. 6 shows the top view of the present invention during its fourth stage of construction. Wedge top (71) is illustrated in place as wedge (70) is used to form cradle (95). Also, it can be noted that left base leg (72) and right base leg (74) have not yet been separated to form a triangular base of the stand.

Figure 7:
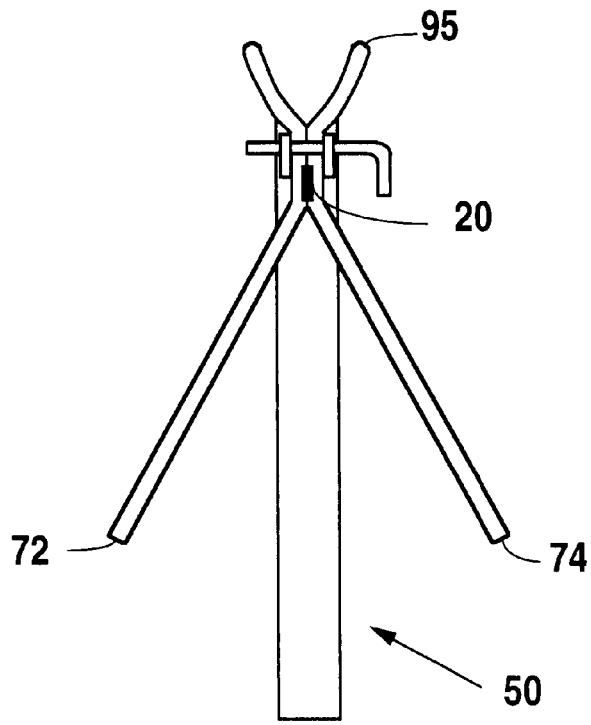
FIG. 7 is a rear view of the present invention in the fifth stage of manufacturing attached to a jig.

As shown in FIG. 6, the cradle (95) has been fully formed by driving wedge (70) in between steel rods (10) at the contact point between steel rods (10) which exist between base weld (20) and middle weld (24). Wedge (70) is driven in between steel rods (10) until the resulting cradle (95) form has an elliptical shape which measures approximately 4½ inches wide at its widest point, by 7½ inches long. Steel rods (10) are now heated in that area between base weld (20) and the end points of left base leg (72) and right base leg (74) until malleable. FIG. 7 shows that after locking the heated steel rods (10) on jig (50), the end points of left base leg (72) and right base leg (74) are spread apart until there is a distance of approximately 12½ inches between them.

The resulting free-standing tripod is then placed on a suitable frame with a screw tensioner (not shown) to compress the distance between apex leg (76) and left and right base leg (72) and (74). This will increase the height of stand (100) to whatever is desired. Thus, with simple compression, stand (100) can be fabricated to accommodate the physical size of various farriers. While held within the compression framework (not shown), stand (100) may have foot elements (80) added, which may consist of chain links of ⅜ inch diameter iron welded to the end points of left and right base legs (72) and (74), and apex leg (76).

Figure 8:
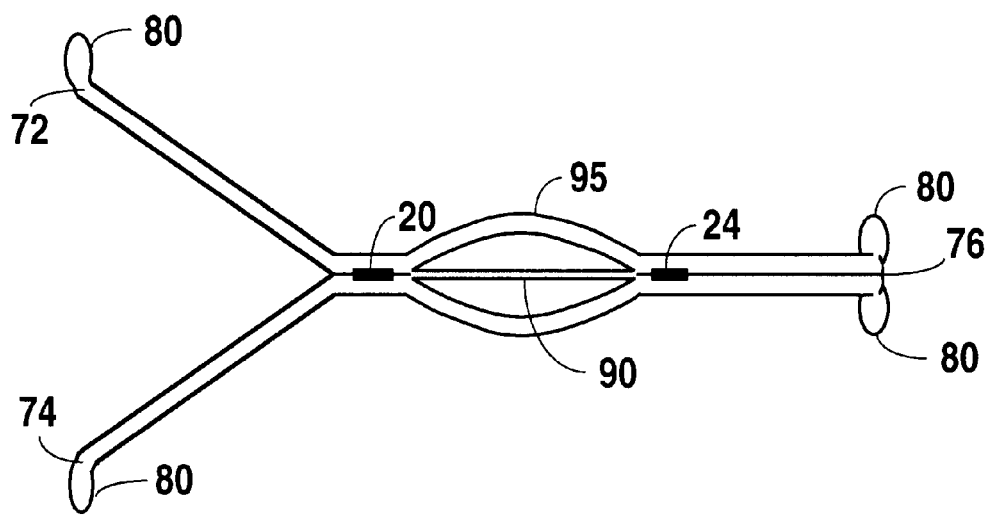
FIG. 8 is a top plan of the present invention.

FIG. 8 illustrates the completed stand (100) after it has been removed from jig (50) and cradle limiting element (90) has been inserted into the bottom of cradle (95). Limiting element (90) consists of a steel bar of approximately 7½ inches in length which is welded at its ends to the juncture of base weld (20) and middle weld (24). The addition of limiting element (90) provides additional stability to stand (100) and prevents the foot of an animal being trapped within cradle (95).

Although the invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

I claim:

1. A farrier's work stand comprising:

an apex leg, a left base leg, and a right base leg, said legs each having a distal end, said legs upwardly extending away from said distal ends to intersect at an open cradle, said open cradle opening in an elliptical shape and having a limiting element attached at each end point of said ellipse and extending beneath said cradle, said limiting element providing open space along longitudinal sides of said elliptically shaped cradle.

2. A farrier's stand comprising:

two parallel rods of substantially equal length each having a first end and a second end, said rods connected at a first end junction, at a first mid-section junction, a second mid-section junction, said rods having an inverted U-shape;

an elliptical-shaped cradle formed in said stand by an outward extension of said rods between said first mid-section junction and said second mid-section junction, said cradle having a limiting element extending beneath said rods between said first and said second mid-section junctions;

said first ends of said rods forming a composite first leg of said stand, said second ends of said rods spaced apart and forming a second leg of said stand and a third leg of said stand.

* * * * *